(12) United States Patent
Al-Azzawi (10) Patent No.: US 7,780,416 B2
(45) Date of Patent: Aug. 24, 2010

(54) BLINKING SAIL WINDMILL

(76) Inventor: Jasim Seleh Al-Azzawi, 5501 Seminary Rd., Apt. 2610, Falls Church, VA (US) 22041

( * ) Notice: Subject to any disclaimer, the term of this patent is extended or adjusted under 35 U.S.C. 154(b) by 547 days.

(21) Appl. No.: 11/790,494

(22) Filed: Apr. 26, 2007

(65) Prior Publication Data

US 2008/0267776 A1  Oct. 30, 2008

(51) Int. Cl.
*F03D 3/02* (2006.01)
(52) U.S. Cl. .................. 416/111; 416/117; 416/132 B; 416/132 A
(58) Field of Classification Search .............. 416/111, 416/117, 120, 132 B, 132 A
See application file for complete search history.

(56) References Cited

U.S. PATENT DOCUMENTS 1,286,853 A * 12/1918 Weaver .................... 416/50
3,920,354 A * 11/1975 Decker .................... 416/117
4,365,935 A * 12/1982 Zukeran .................. 416/117
4,649,284 A * 3/1987 Hsech-Pen ................. 290/55

* cited by examiner

*Primary Examiner*—Edward Look
*Assistant Examiner*—Jesse Prager
(74) *Attorney, Agent, or Firm*—Moore Patents; David Dreyfuss (57) ABSTRACT

Four wide frames are fixed to a vertical axis. The frames have horizontal bars ten centimeters apart. On each horizontal bar, a sheet of cloth twenty centimeters high and as wide as the frame is hung such that the sheets of cloth are all on the same side of the frames so that when the wind blows from any direction, the windmill rotates in the same direction. For frames facing the wind direction, on one side of the axis, the wind will blow the sheets of cloth away from the frame, and the wind will pass through the frame. On the other side of the axis, the wind will blow the sheets of cloth, but the horizontal bars will stop them from blowing to the other side of the frame such that the sheets of cloth stick to the frame and prevent the wind from passing through. The frame on that other side will act like a big sail.

11 Claims, 14 Drawing Sheets

BLINKING SAIL WINDMILL

BACKGROUND OF THE INVENTION

This invention is in the field of windmills. This invention will generate electrical power hundreds of times more than any current windmill, plus the cost of manufacture is a fraction of the current windmill. This windmill will generate electricity even if the speed of wind is extremely low or almost at a standstill.

Sails are capable of generating power strong enough to move a massive ship, otherwise it will require a huge engine. The power generated by the blinking sail windmill will be comparable to utilizing the most powerful engine.

BRIEF SUMMARY OF THE INVENTION

On a vertical axis we fix four wide frames and mount them on two ball bearings to permit free movement. The frames have horizontal bars separated by a distance of ten centimeters and on each horizontal bar we hang a sheet of cloth twenty centimeters in length and a width equal to the frame width of the blinking sail windmill.

All the frames should have their sheets of cloth on the same side of the frame, either left or right.

The blinking sail windmill will rotate in one fixed direction regardless from which direction the wind is blowing. Since the frames which are facing the wind one of them the wind will blow the sheets of cloth away and passes through the frame and the other frame on the other side of the blinking sail windmill the wind will blow the sheets of cloth but the horizontal bars stops them from blowing to the other side of the frame so they stick to the frame preventing the wind from passing through so all the frame will act like a big solid one piece sail.

The result is a windmill that at any instance one of its sails is blocking the wind while the others will allow the wind to pass through.

BRIEF DESCRIPTION OF THE SEVERAL VIEWS OF THE DRAWINGS

Explanation of symbols used in drawings.
A: Central vertical post of the blinking sail windmill.
B: Frame of the sail with horizontal bars.
C: Sheet of cloth or sheet of transparent plastic.
D: Concrete foundation.
E: Strong steel wire.
F: Support beam for the wire.
G: Date palm tree.
H: Direction of wind
J: Rotation direction of blinking sail windmill.
K: Ball bearing on which the frames are fixed.
L: Inactive gap of the frame.
M: Horizontal bars of the frame on which sheets of cloth are hanged.
N: Vertical bars to support the frame.

FIG. 1

Shows the main parts of the windmill and how the frames (B) are fixed on the central vertical post (A) of the windmill.

FIG. 2

The massive size of the windmill and the power it generates can be appreciated by its relevant proportion to the date palm tree (G).

The concrete foundation (D) is to hold the windmill in position against a strong wind by a strong steel wire (E) which connects the central vertical post (A) to the concrete foundation (D) by a support beam (F).

FIG. 3

Shows the entire windmill, including the sheets of cloth (C), drawn in this figure as if they are made of transparent plastic.

FIG. 4

Shows the entire windmill including, the sheets of cloth (C), drawn in this figure as if they are made of non-transparent materials like textile or Aluminum.

FIG. 5

This figure shows the left side frame of the windmill facing the wind (H) which is blowing the sheets of cloth (C) away and passes easily through the frame (B).

At the same time we can also see the right side frame of the windmill which is facing the wind (H) and how the wind is pushing the sheets of cloth (C), but the horizontal bars prevent the sheets from blowing over to the other side of the frame (B), thus they stick to the frame (B) and prevent the wind (H) from passing through the frame, ensuring that the entire frame will act like one giant solid sail.

The direction of rotation of the windmill (J), as shown in this figure, is anti-clockwise because the sheets of cloth (C) are fixed on the left side of the frames of the windmill.

The figure also shows that the other two frames of the windmill are not facing the wind (H), yet their sheets of cloth are blown away and allow the air to pass freely through the frames. The reason for this is due to the rotation of the frames and the fact that the sheets of cloth (C) are very light so they are pushed away by air which passes easily through the frames.

The net result of this dynamics is a wind-driven sail rotating in a circle and keeping its position fixed on the ground. Although, the windmill has four sails, through its dynamics only one of them will block the wind and act Like a sail while the other three will allow the wind to pass through them freely without obstruction.

FIG. 6

This figure clearly shows the left and right side frames of the windmill without any obstruction where the left side is facing the wind (H) which is blowing the sheets of cloth (C) away and passes through the frame B.

The figure also shows the right side frame of the windmill facing the wind (H) which is pushing the sheets of cloth (C) but the horizontal bars stops the sheets from blowing over to the other side of the frame (B), so they stick to the frame (B) and prevent the wind (H) from passing through it, thus ensuring that the frame will act like one giant solid sail.

The direction of rotation of the windmill (J) as shown in this figure is anti-clockwise.

FIG. 7

This figure shows the two middle frames of the windmill.

The two frames are not facing the wind (H) but their sheets of cloth (C) are blown away and they allow the air to pass freely through the frames. The combined reasons for that are the rotation of the frames and the lightness of sheets of cloth (C) as they are easily pushed away by air which passes freely through the frames.

FIG. 8

This figure shows three frames of the windmill. The middle frame shows sheets of cloth (C) sticking to frame (B) as a result of wind force. In this instance the frame acts like a wind-blocking sail, so the power of the wind pushes the sail exactly like when wind moves a huge ship in the sea by driving its sails. Clearly this windmill and its frames are capable of turning a big electrical generator.

The other two frames in this figure, the left and right ones, show frames with their sheets of cloth (C) blown away, thus allowing the wind or air to pass through them freely.

There is a gap (L) between the active part of the frame and the central vertical post (A) of the windmill. The width of this gap can be as narrow as one meter, in which case the windmill will rotate at a higher speed, or as wide as 3-4 meters in which case the windmill will rotate at a slower speed but the windmill will have higher strength or torque.

FIG. 9

This figure shows two options of the central vertical post (A) of the windmill. On the right-hand side of the figure we can see the central vertical post (A) without any support from strong steel wires and concrete foundations. In this instance (A) must be extremely strong, have a wide diameter, and a ball-bearing (K) with a large diameter.

These three features will drive the cost of this windmill up.

The second option is seen on the left-hand side of this figure where the central vertical post (A) is supported by strong steel wires (E) via the support beam (F) which is fixed to strong concrete foundations (D). In this instance the central vertical post (A) can have a very small diameter and smaller ball-bearing (K) resulting in driving the cost down and rendering the windmill resistant to higher wind speed.

FIG. 10

Shows a windmill where the frames have vertical bars (N) and horizontal bars (M), where the horizontal bars (M) are for the sheets of cloth (C) to be hanged on, while the vertical bars (N) are to support the frame, but they must be located on the other side of the frame and not on the side on which the sheets of cloth (C) are hanged.

FIG. 15 shows movable lower horizontal bars O moved out of the plane of frame B, forming variable gaps Q allowing air leakage if wind H is strong.

DETAILED DESCRIPTION OF THE INVENTION

Figure 1:
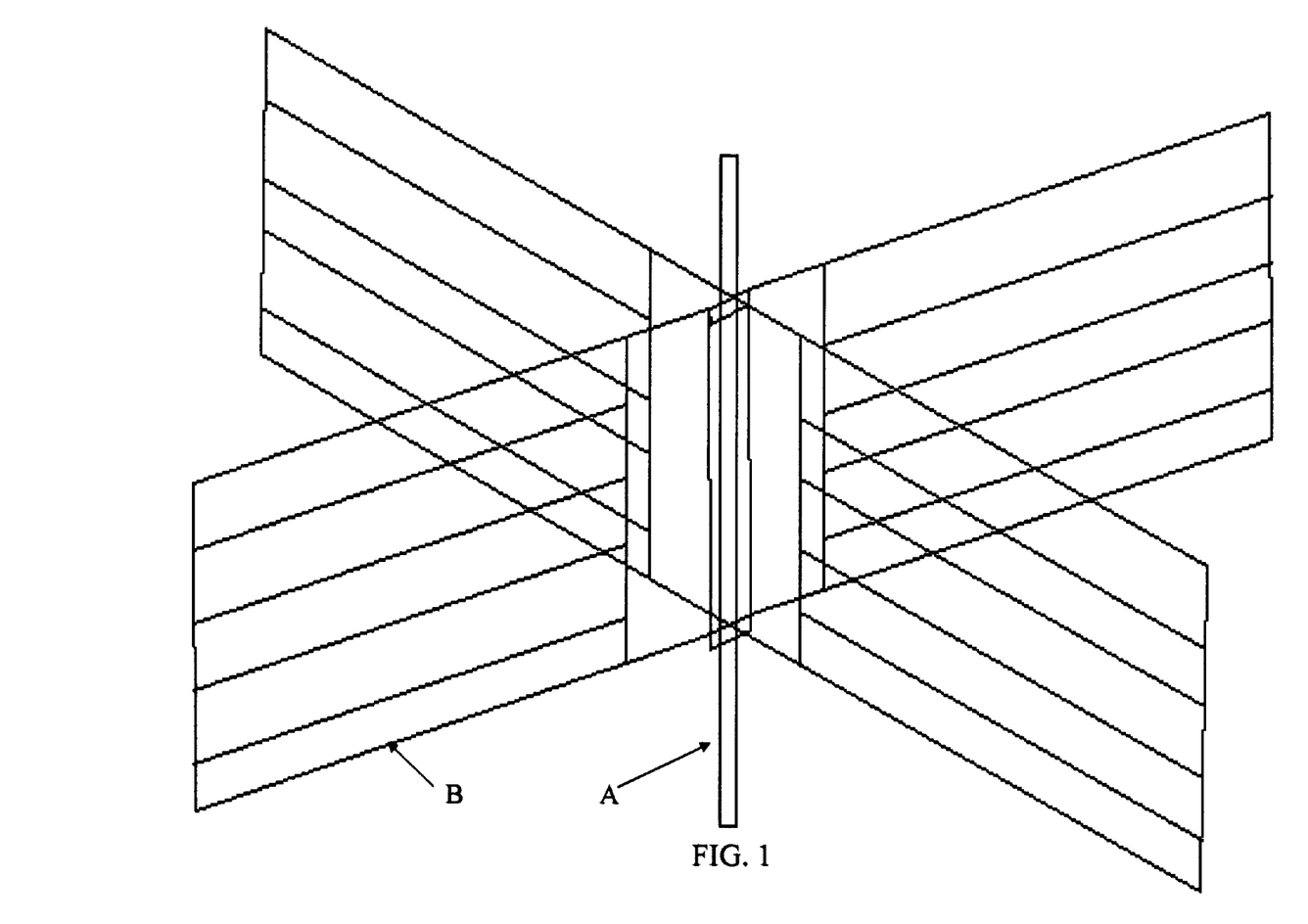
Figure 2:
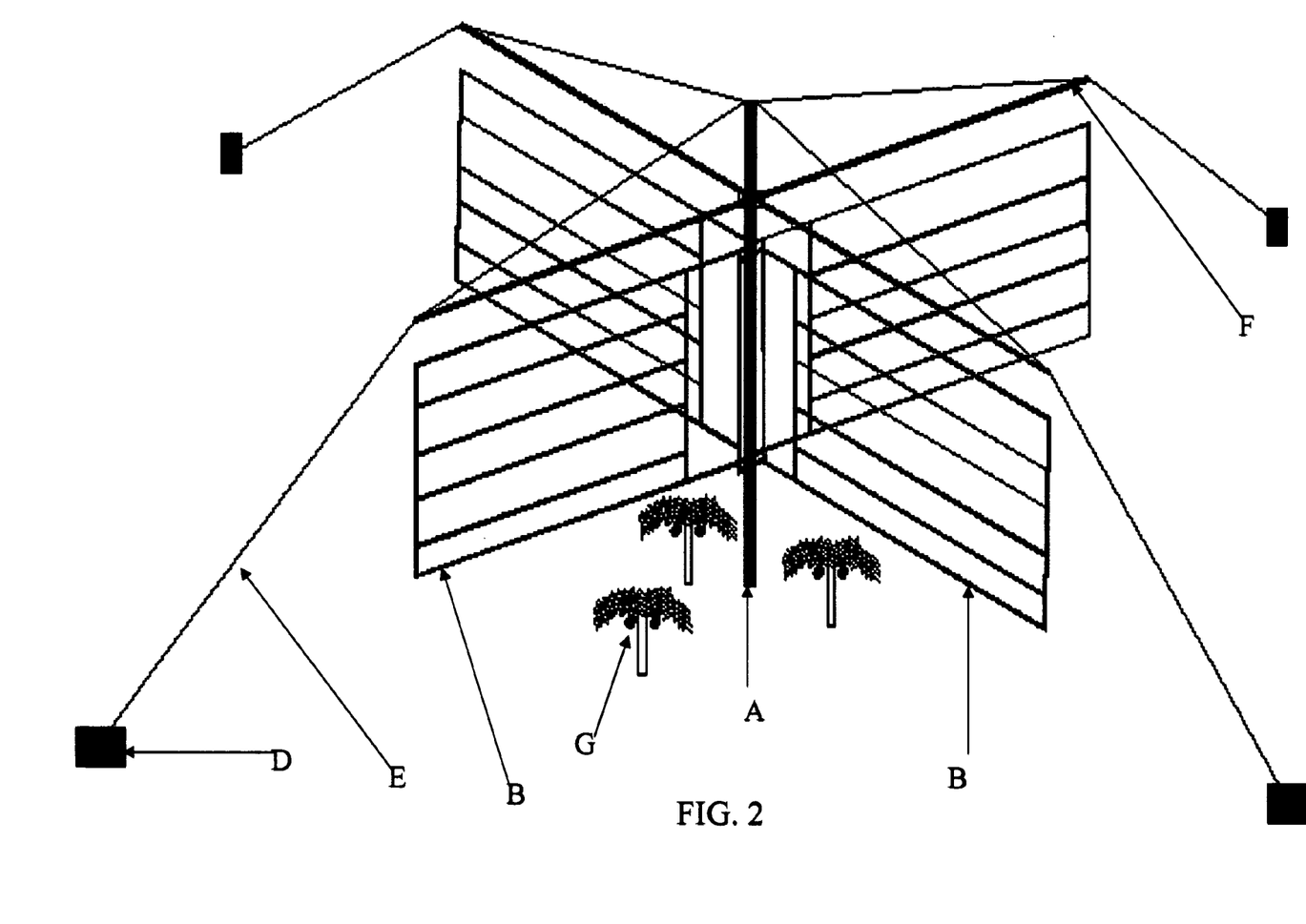
Figure 3:
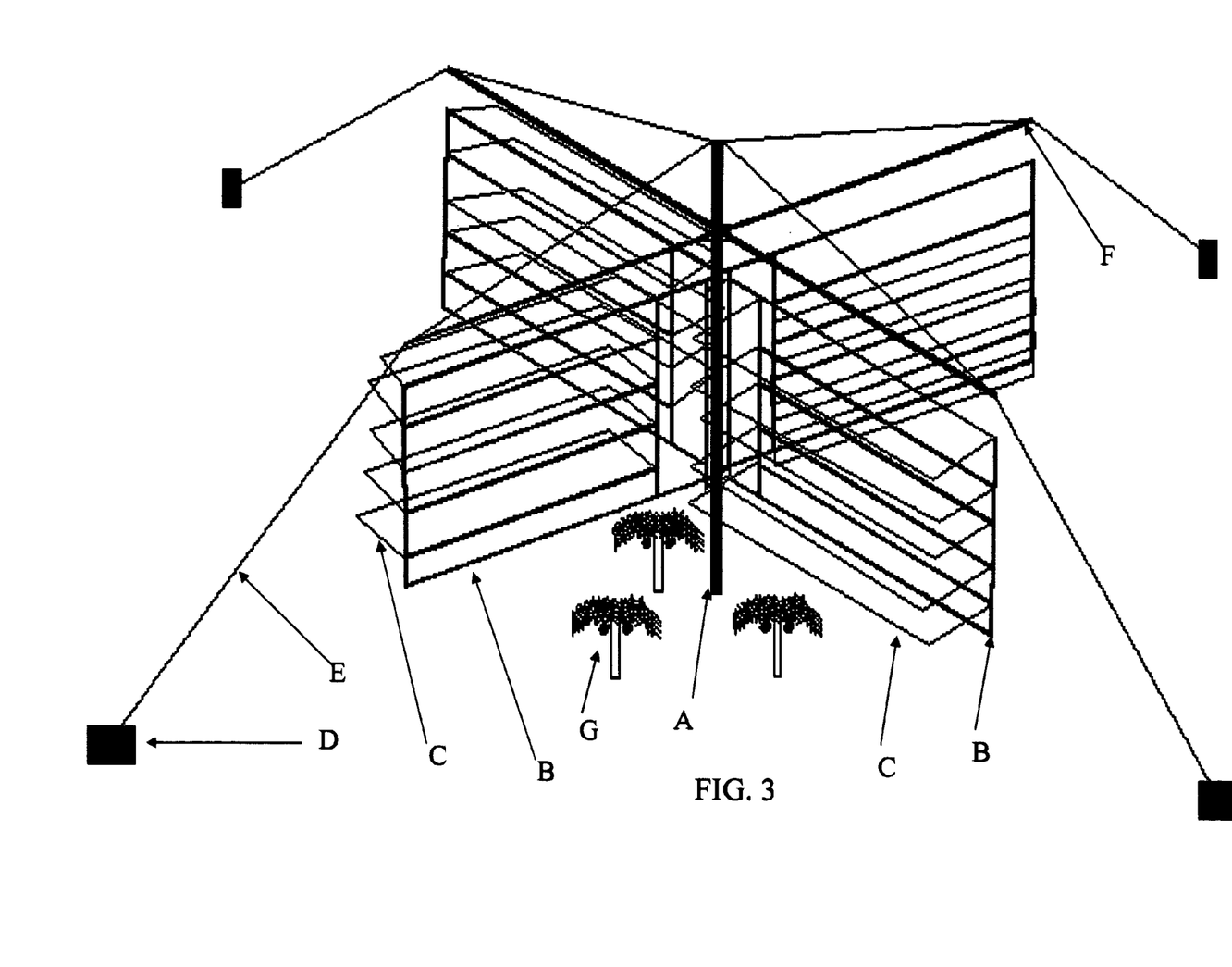
Figure 4:
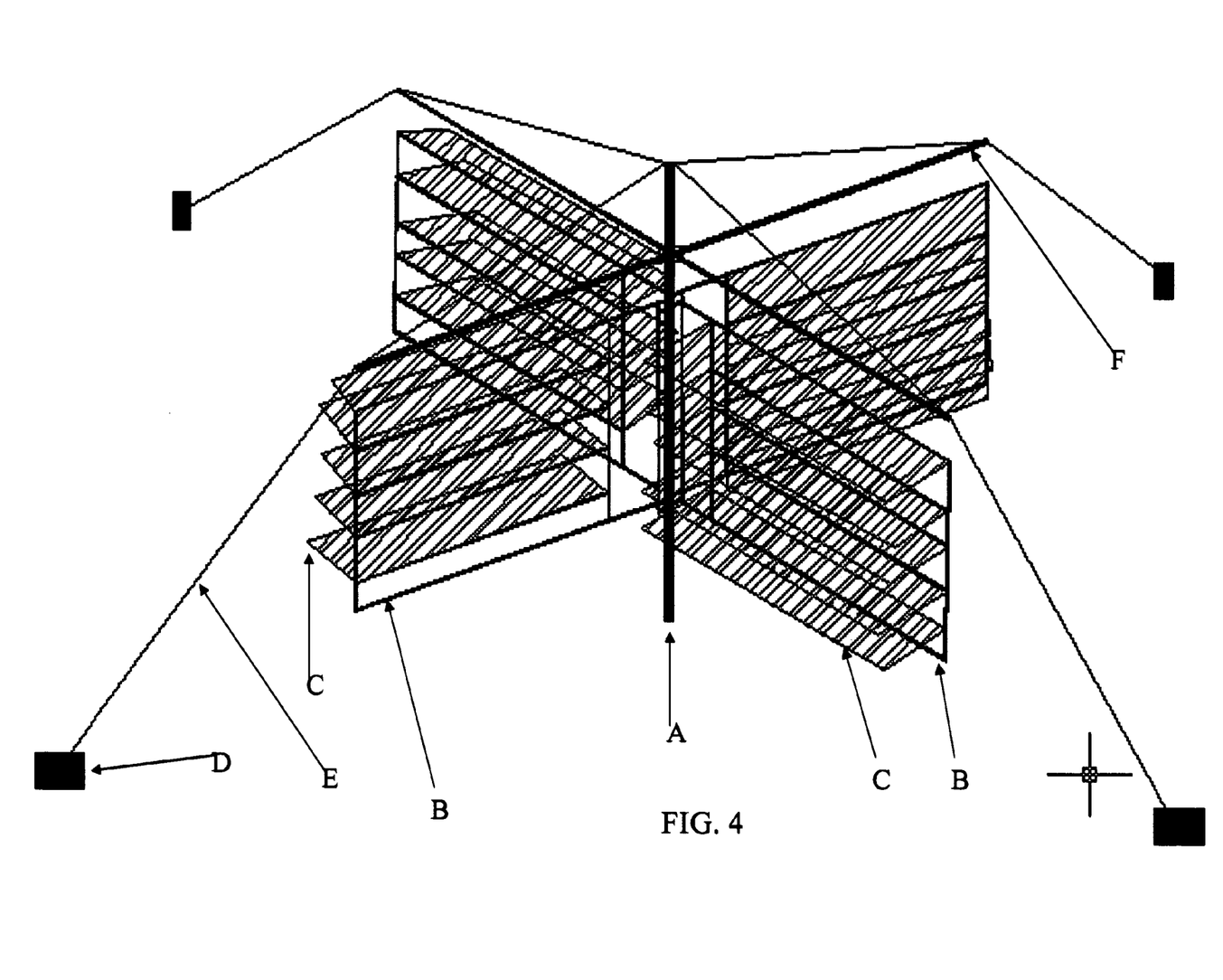
Figure 5:
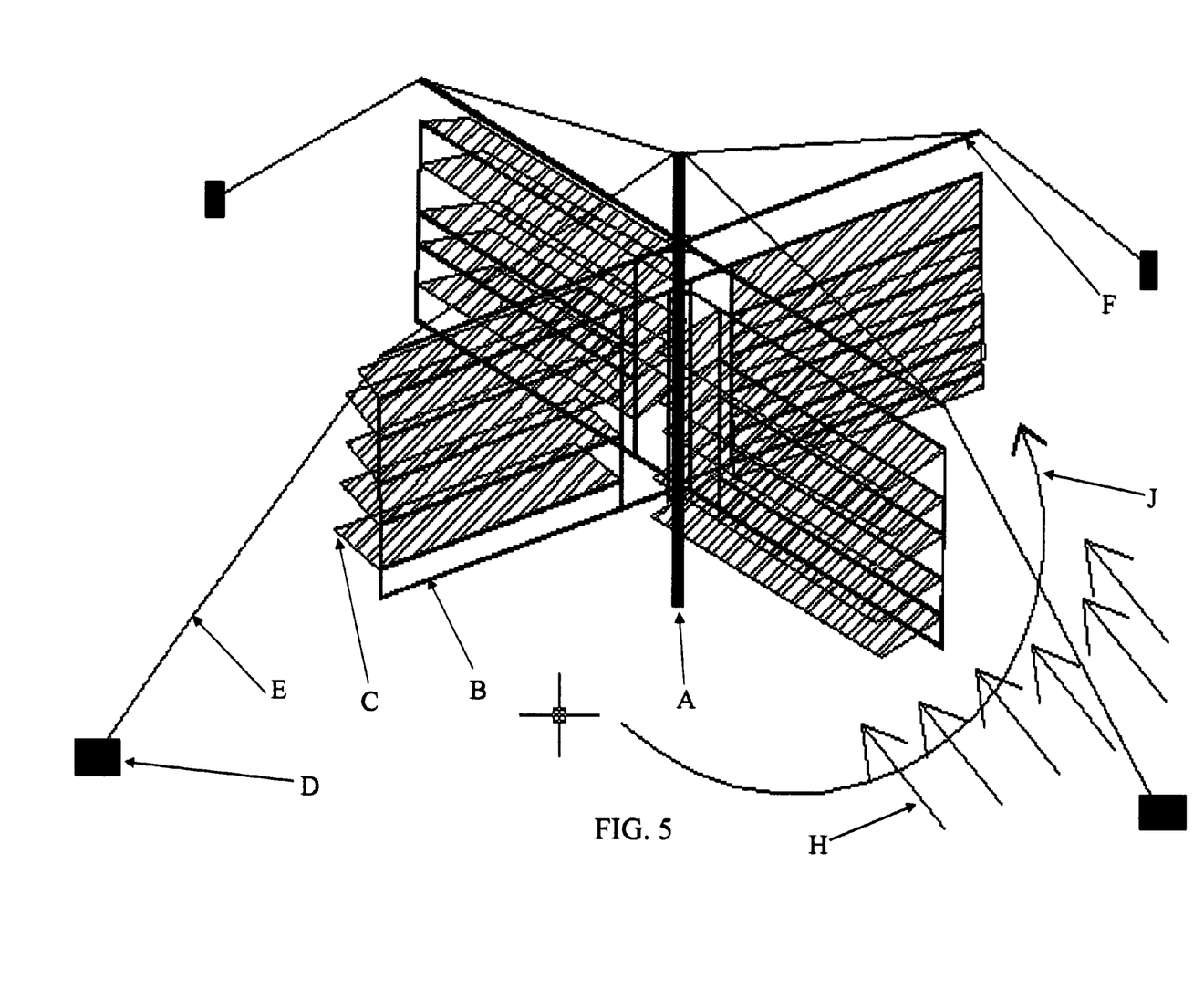
Figure 6:
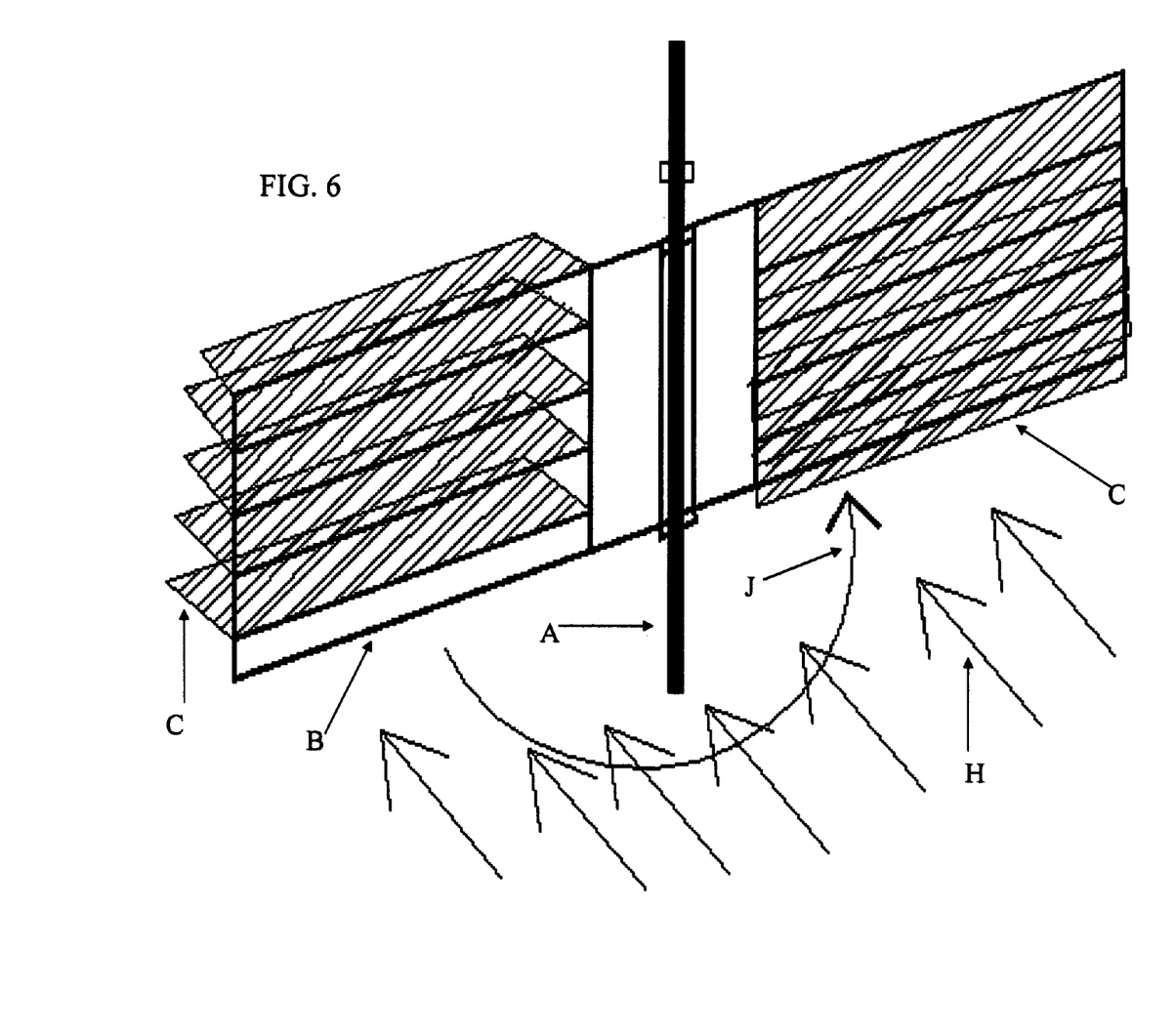
Figure 7:
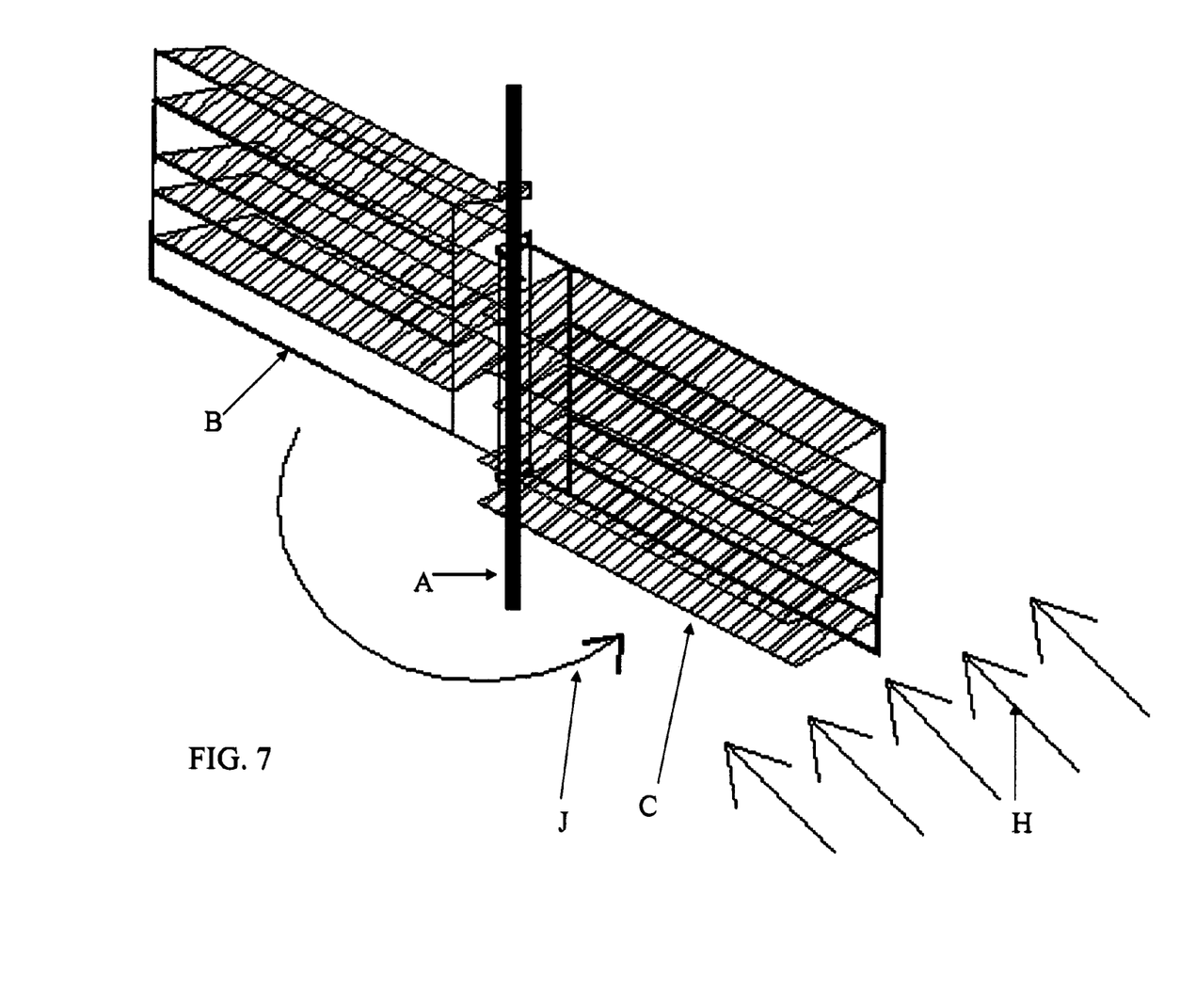
Figure 8:
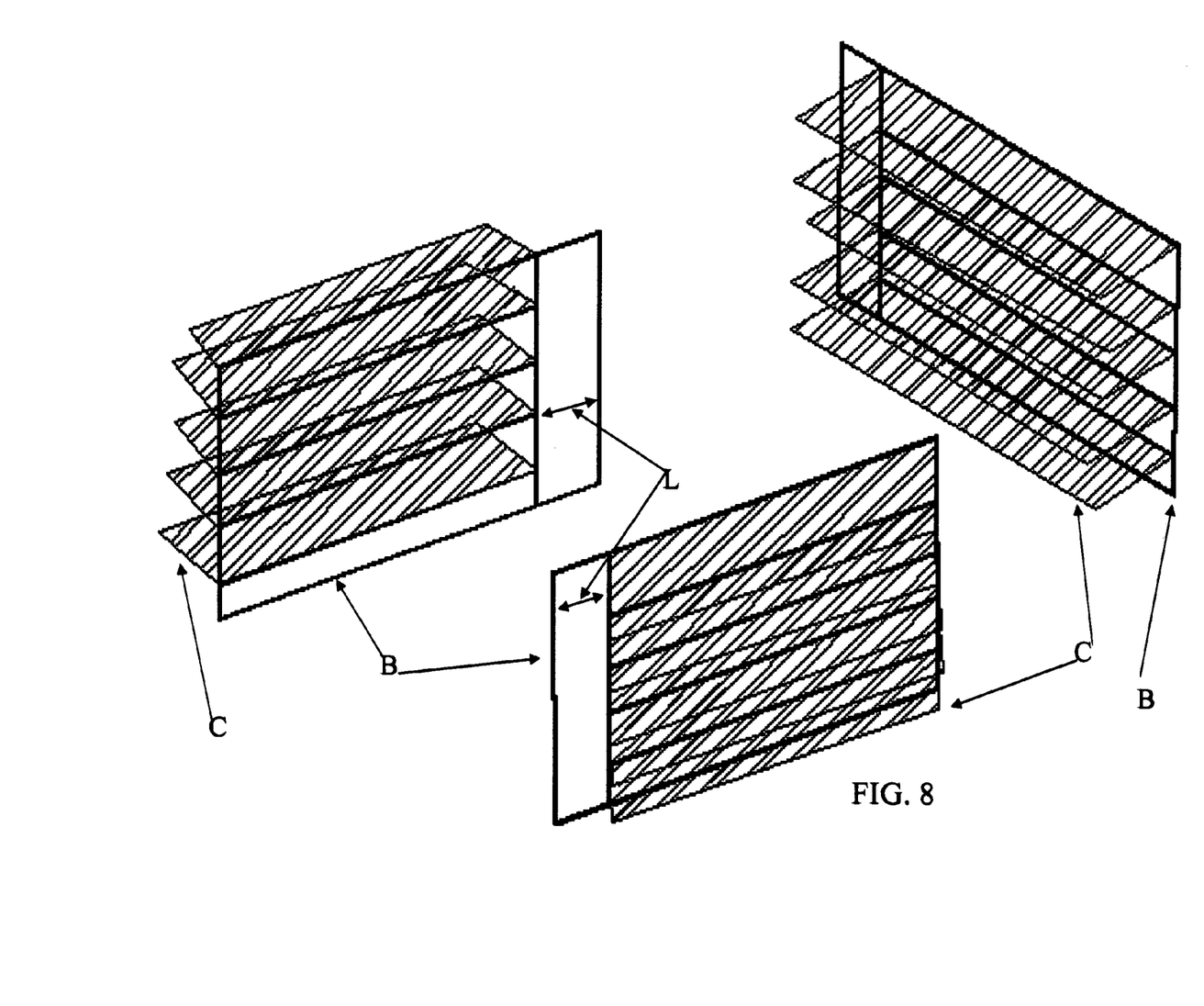
Figure 9:
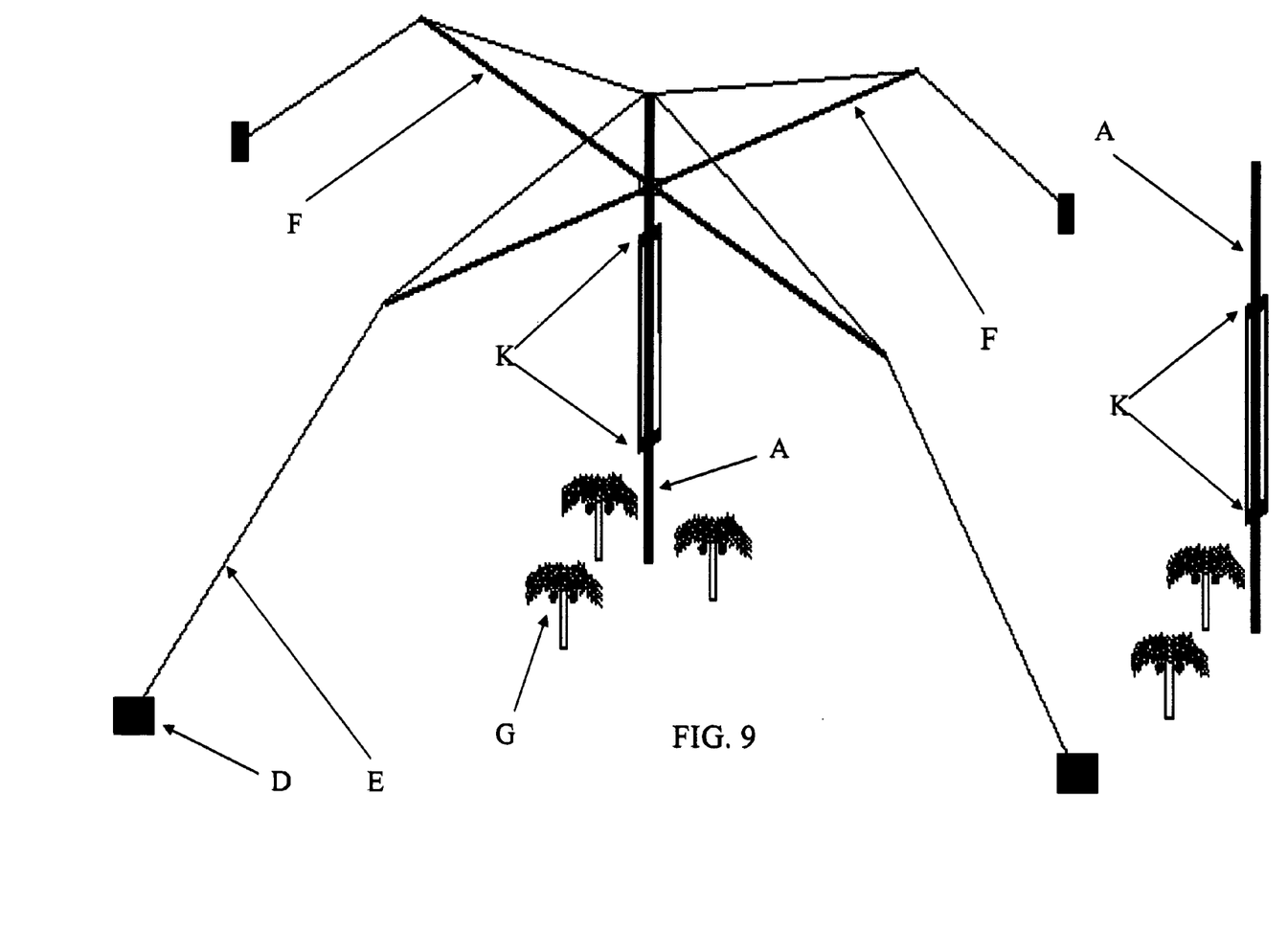
Figure 10:
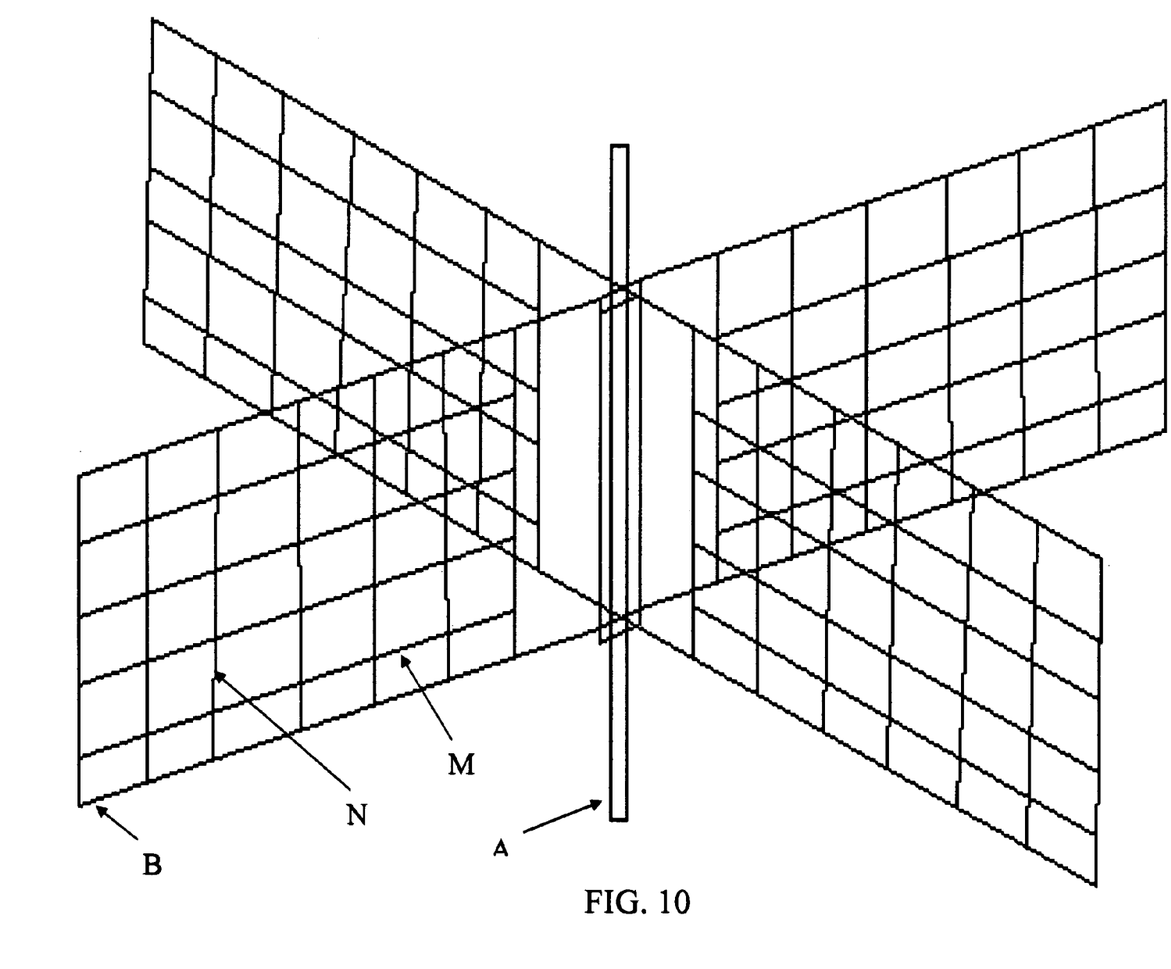
Figure 11:
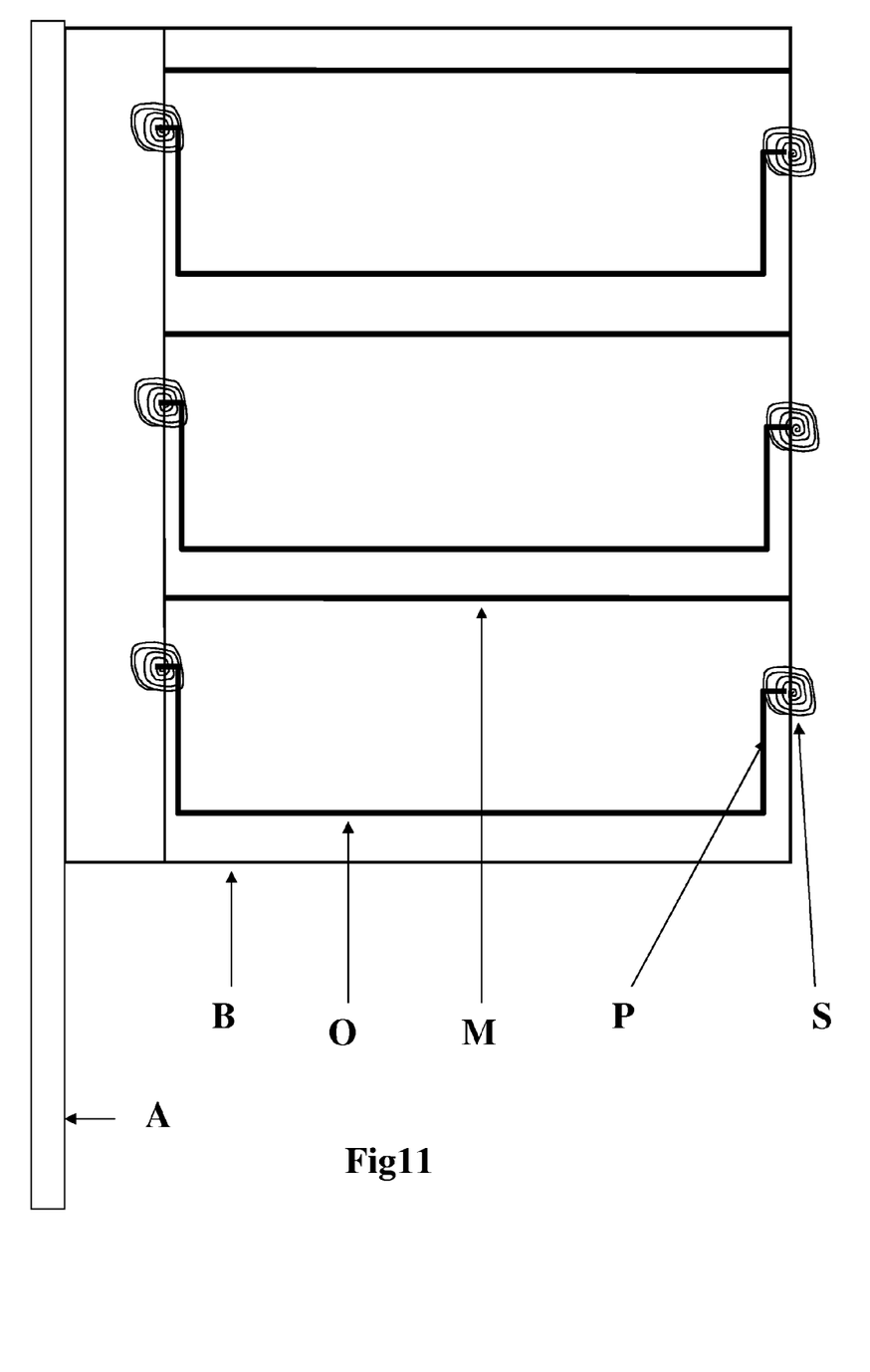
FIG. 11 shows one frame B attached to the central vertical post A of the blinking sail windmill with movable lower horizontal bars O attached to the frame B via side arms P and spiral springs S where the spiral springs S are fixed to the frame B. Also shown are the static upper horizontal bars M of the frame B on which sheets of cloth are hung.
Figure 12:
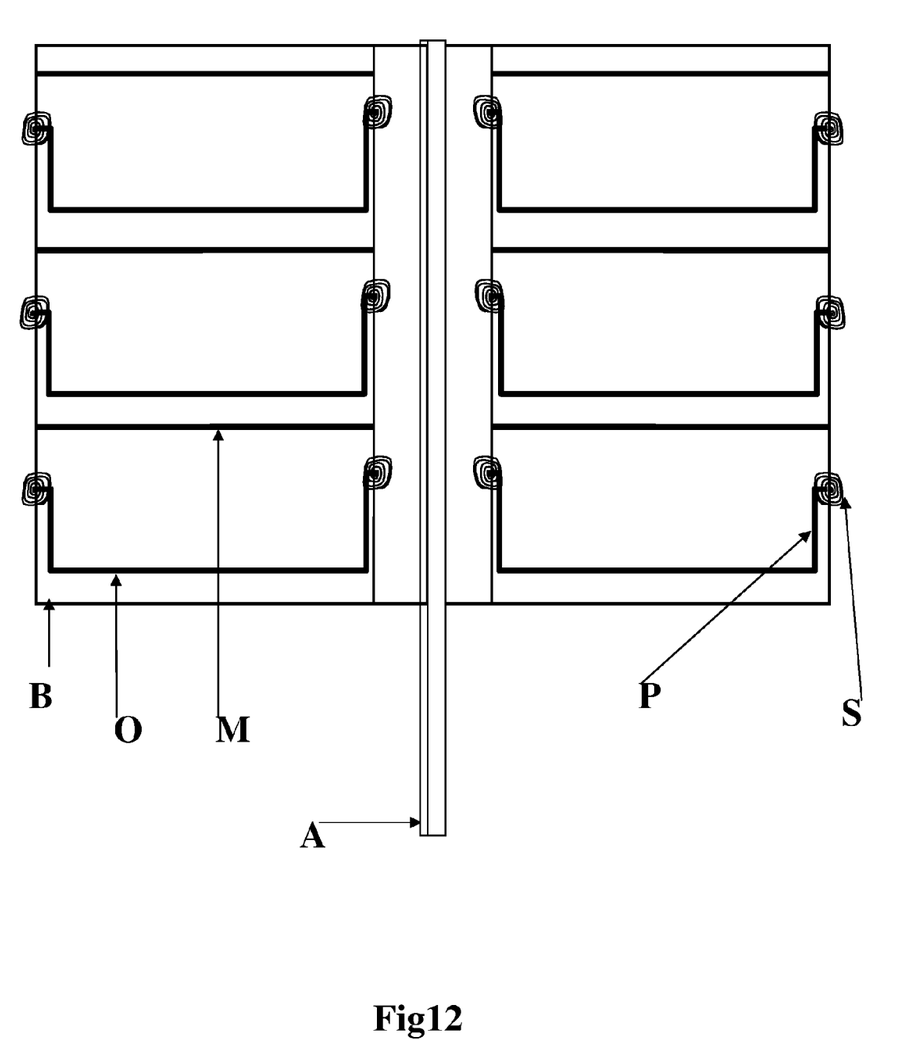
FIG. 12 shows two frames B attached to the Central vertical post A of the blinking sail windmill where the movable horizontal bars O attached to the frame B via the side arms P to the spiral springs S where the spiral springs S are fixed to the frame B. Also shown are the static upper horizontal bars M of the frame B on which sheets of cloth are hung.
Figure 13:
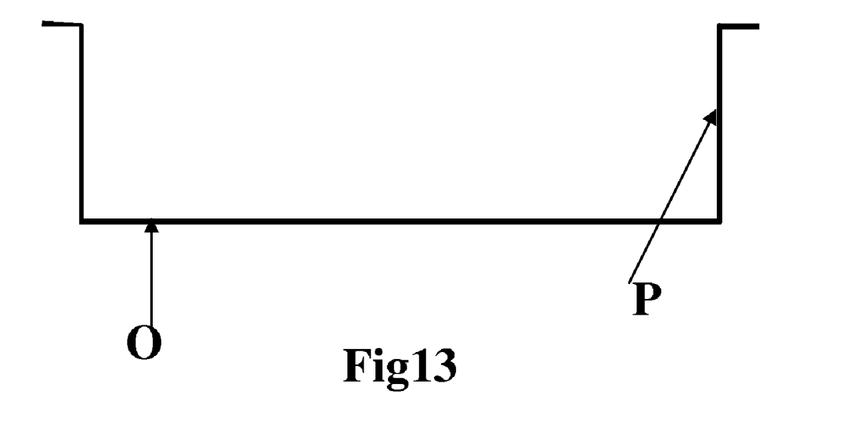
FIG. 13 shows one movable lower horizontal bar O with side arms P.
Figure 14:
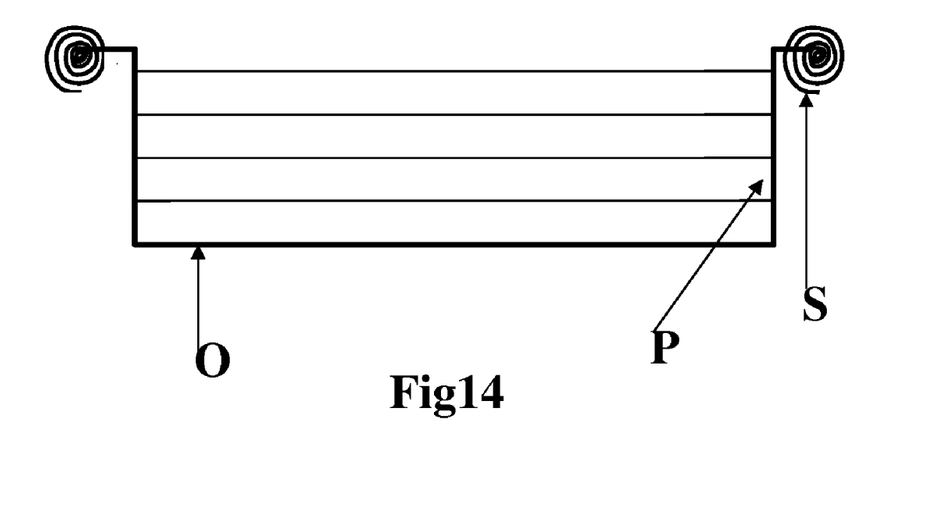
FIG. 14 shows one movable lower horizontal bar O with side arms P attached to spiral springs S.
Figure 15:
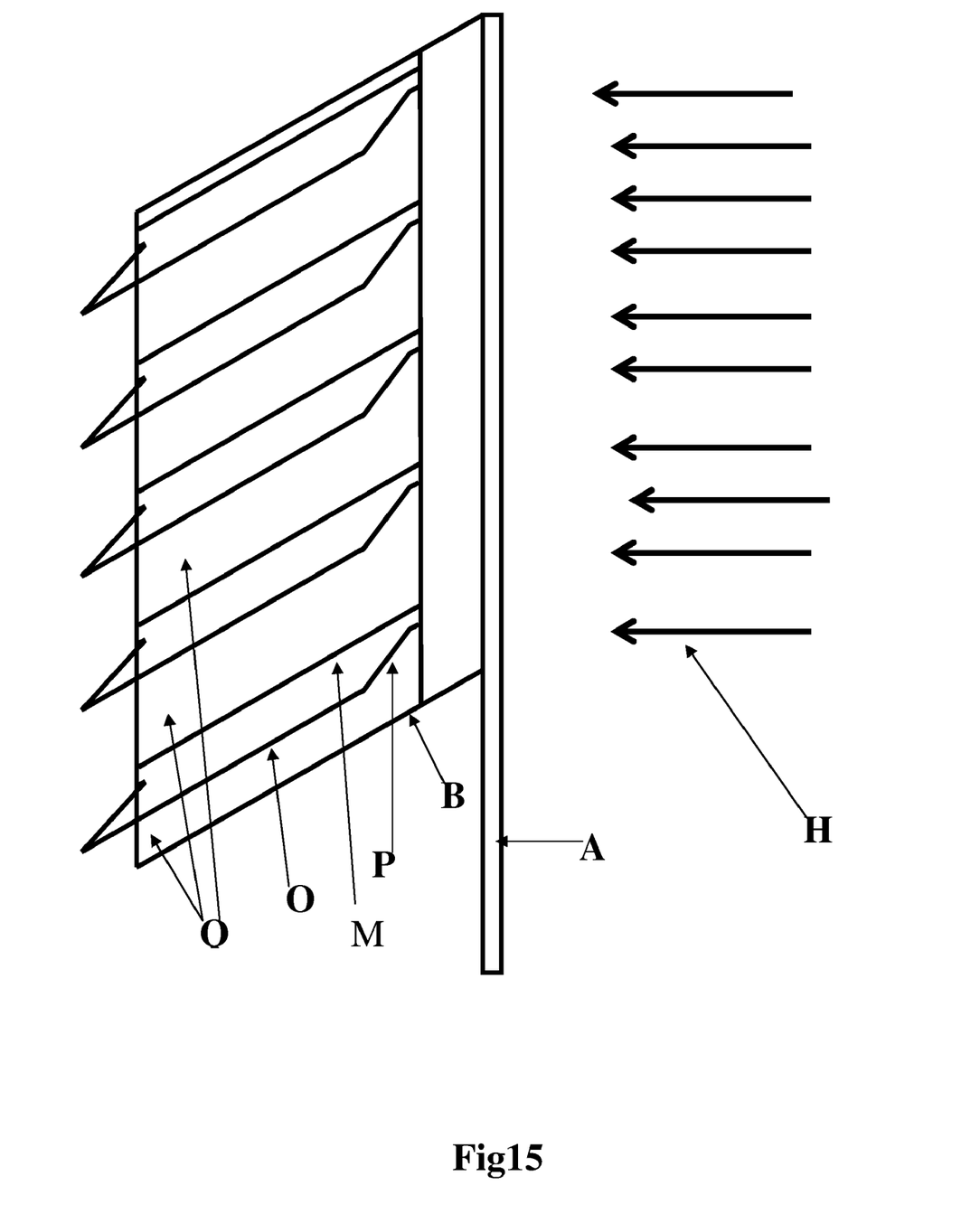
FIG. 15 shows one frame B attached to the central vertical post A of the blinking sail windmill with static upper horizontal bars M and movable lower horizontal bars O attached to the frame B via side arms P and to the frame B.

The idea for the blinking sail windmill came to me while I was observing sails of ships and thinking of new and creative ways how to utilize wind power in an efficient and large magnitude in a stationary manner fixed in the ground and not onboard moving ships.

On a vertical axis we fix three or four or five or more big frames all mounted on two ball bearings to permit free movement. The frames have horizontal bars separated by a distance of ten centimeters and on each horizontal bar we hang a sheet of cloth twenty centimeters in length and a width equal to the frame width of the blinking sail windmill.

The blinking sail windmill will rotate in one fixed direction regardless from which direction the wind is blowing, since the frames which are facing the wind one of them the wind will blow the sheets of cloth away and passes through the frame and the other frame on the other side of the blinking sail windmill the wind will blow the sheets of cloth but the horizontal bars stops them from blowing to the other side of the frame so they stick to the frame preventing the wind from passing through so all the frame will act like one big solid sail capable of generating huge power capable of moving a big ship or rotating a big electric generator.

The result is a windmill that at any instance one of its sails is blocking the wind while other sails are allowing the wind to pass through. Thus, it will generate a huge power that could be connected to an electric generator for the purpose of generating electricity or to a water pump to lift water or other devices in need of power.

The sheets are not necessarily made of cloth but can be made of sheets of plastic, Aluminum or any other light material a very weak wind is capable of blowing it away and pass through the frame.

The sheet can be one piece covering the whole width of the frame or several pieces adjacent to each other to cover the width of the frame.

The distance between the horizontal bars can be any distance and not necessarily ten centimeters.

The sheets of cloth can be of any length according to the design made.

The frames may be made of steel, Aluminum or even plastic especially for the small blinking sail windmills used by single houses and fixed on roof tops to generate elasticity for household uses.

We may add vertical bars to support the frame but it must be on the other side of the frame not on the same side where the sheets are hanging.

A mechanism to prevent damage to the blinking sail windmill by powerful wind is achievable by having two types of horizontal bars. The upper horizontal bar is to firmly fix the position of sheet of cloth and the lower horizontal bar which is going to stop the sheet of cloth from been blown to the other side this horizontal bar should have two arms the arms fixed on the frame using a spiral spring.

When the wind is strong, the power on the sheet of cloth exerted by the wind will push the movable horizontal bar to the other side letting part of the wind to pass through, and as the wind gets stronger, the gap gets bigger letting more wind to pass through so the strength of the spiral spring limits the size of the gap. The manufacturer should make many experiments so as to use the most suitable spiral spring to keep the blinking sail windmill safe in all kinds of winds.

The best mode for carrying out this invention is by adding movable horizontal bars to the blinking sail windmill to give it safety against strong winds.

The industrial applicability of this invention will be great since it will provide cheap energy on a global scale, raise standard of living of poor communities and contribute significantly to the reduction of global warming.

All over the world people will benefit from this invention by the use of electricity generated by this invention for heating homes, lighting and other household activities.

Large fields dotted with thousands of blinking sail windmills will be capable of supplying big cities with electricity plus it will generate enormous amount of hydrogen gas then liquefy it and fill it inside cylinders to be used by cars running on hydrogen gas.

Manufacturers from the very beginning must standardize the direction of rotation of the blinking sail windmill I think it should be anticlockwise therefore the sheet of cloth must be on the left side of the frame.

I claim:

1. A vertical axis windmill comprising a set of frames attached via horizontal bars to a vertical axis of rotation, each frame comprising a plurality of upper horizontal bars, a plurality of matching lower horizontal bars, and a plurality of sheets of lightweight material wherein the upper edge of each sheet of lightweight material is fixed at one of said upper horizontal bars, each of said sheets of lightweight material is allowed to move by pivoting or bending relative to said one of said upper horizontal bars, and the remaining edges of said sheets of lightweight materials are not attached to any structural support; wherein said lower horizontal bars are positioned to stop said sheets of lightweight material from being blown to one side of said lower horizontal bars, said one side being on the same side of each frame relative to the direction of rotation of said vertical axis windmill; wherein said lower horizontal bars are movable toward said one side of said frame such that there is a variable gap to allow part of the air to pass through in the downwind direction; wherein each of said movable lower horizontal bars is attached to side arms pivotably connected to said frame and wherein spiral springs are attached to said side arms to control the size of said gap.

2. The vertical axis windmill of claim 1 wherein the amount of air allowed to pass through said variable gap is adjusted to increase as the power of the wind increases.

3. The vertical axis windmill of claim 1 wherein the amount of air allowed to pass through said variable gap is adjusted to make said vertical axis windmill safe in all kinds of winds.

4. The vertical axis windmill of claim 1, wherein said lightweight material comprises cloth.

5. The vertical axis windmill of claim 1, wherein said lightweight material comprises plastic.

6. The vertical axis windmill of claim 1, wherein said lightweight material comprises aluminum.

7. The vertical axis windmill of claim 1, wherein the inner vertical edge of each frame is spaced from said vertical axis of rotation by a distance of between 1 and 4 meters.

8. The vertical axis windmill of claim 1, wherein the height of said frames is larger than 15 meters.

9. The vertical axis windmill of claim 1, wherein the width of said frames is larger than 15 meters.

10. The vertical axis windmill of claim 1, wherein the height of said frames is larger than 15 meters and the width of said frames is larger than 15 meters.

11. A vertical axis windmill comprising a set of frames attached via horizontal bars to a vertical axis of rotation, each frame comprising a plurality of upper horizontal bars, a plurality of matching lower horizontal bars, and a plurality of sheets of cloth wherein the upper edge of each sheet of cloth is fixed at one of said upper horizontal bars, each of said sheets of cloth is allowed to move by pivoting or bending relative to said one of said upper horizontal bars, and the remaining edges of said sheets of cloth are not attached to any structural support; wherein said lower horizontal bars are positioned to stop said sheets of cloth from being blown to one side of said lower horizontal bars, said one side being on the same side of each frame relative to the direction of rotation of said vertical axis windmill; wherein each of said movable lower horizontal bar is attached to side arms pivotably connected to said frame and wherein spiral springs are attached to said side arms to control the size of a gap such that the amount of air allowed to pass through is adjusted to increase as the power of the wind increases; and wherein the inner vertical edge of each frame is spaced from said vertical axis of rotation by a distance of between 1 and 4 meters.

* * * * *